US012104081B2

(12) United States Patent
Yang

(10) Patent No.: US 12,104,081 B2
(45) Date of Patent: Oct. 1, 2024

(54) ANTIMICROBIAL COATING COMPOSITION AND METHOD FOR PRODUCING THE SAME

(71) Applicant: NAE WOI KOREA LTD., Seongnam-si (KR)

(72) Inventor: Cheol Ho Yang, Seongnam-si (KR)

(73) Assignee: NAE WOI KOREA LTD., Seongnam-si (KR)

( * ) Notice: Subject to any disclaimer, the term of this patent is extended or adjusted under 35 U.S.C. 154(b) by 268 days.

(21) Appl. No.: 17/584,438

(22) Filed: Jan. 26, 2022

(65) Prior Publication Data

US 2022/0315770 A1   Oct. 6, 2022

(30) Foreign Application Priority Data

Mar. 30, 2021   (KR) ........................ 10-2021-0041432

(51) Int. Cl.
| | |
|---|---|
| *C09D 5/14* | (2006.01) |
| *A01N 65/24* | (2009.01) |
| *A01N 65/34* | (2009.01) |
| *C09D 133/08* | (2006.01) |
| *C09D 175/04* | (2006.01) |

(52) U.S. Cl.
CPC .............. *C09D 5/14* (2013.01); *A01N 65/24* (2013.01); *A01N 65/34* (2013.01); *C09D 133/08* (2013.01); *C09D 175/04* (2013.01)

(58) Field of Classification Search
CPC ...... C09D 5/14; C09D 133/08; C09D 175/04; C09D 7/69; C09D 7/70; C09D 183/04; A01N 65/24; A01N 65/34; A01N 25/28; A01N 25/02; A01N 65/08; C08G 77/04; C08K 9/10; C08L 2201/54; A01P 1/00; B01J 13/20; C09J 1/00; C09J 7/20; C09J 11/00

See application file for complete search history.

(56) References Cited

U.S. PATENT DOCUMENTS

| | | | |
|---|---|---|---|
| 5,976,577 A * | 11/1999 | Green | A61P 29/00 |
| | | | 424/455 |
| 9,714,396 B2 * | 7/2017 | Feng | A61Q 19/10 |
| 9,962,321 B2 * | 5/2018 | Baxter | A01N 25/28 |
| 2006/0071357 A1 * | 4/2006 | Pilon | B01J 13/04 |
| | | | 264/4 |
| 2008/0175812 A1 | 7/2008 | Seabrook et al. | |
| 2013/0280409 A1 * | 10/2013 | Mushock | A23G 4/20 |
| | | | 426/651 |

(Continued)

FOREIGN PATENT DOCUMENTS

| | | |
|---|---|---|
| CN | 110511603 A | 11/2019 |
| CN | 112371065 A | 2/2021 |

(Continued)

*Primary Examiner* — Liam J Heincer
*Assistant Examiner* — Zhen Liu
(74) *Attorney, Agent, or Firm* — Revolution IP, PLLC

(57) ABSTRACT

The present invention relates to an antimicrobial coating composition having antiviral activity against coronavirus, the composition comprising: an adhesive having adhesiveness to a surface coated therewith; and a coronavirus antiviral material which is to be attached to the surface by the adhesiveness of the adhesive and exhibits antiviral activity against coronavirus.

13 Claims, 12 Drawing Sheets

(56) References Cited

U.S. PATENT DOCUMENTS

| | | | | |
|---|---|---|---|---|
| 2014/0088219 A1* | 3/2014 | Chen | ............ | C08L 83/04 |
| | | | | 524/588 |
| 2019/0010336 A1 | 1/2019 | Giorgetti Filho | | |
| 2021/0015108 A1* | 1/2021 | McDaniel | ............ | A01N 25/10 |
| 2021/0106966 A1* | 4/2021 | Jerri | ............ | C11D 3/0015 |
| 2022/0071865 A1* | 3/2022 | Sasaki | ............ | A61Q 15/00 |

FOREIGN PATENT DOCUMENTS

| | | | | |
|---|---|---|---|---|
| KR | 10-2010-0101440 A | 9/2010 | | |
| KR | 10-2016-0012832 A | 2/2016 | | |
| KR | 10-1610870 B1 | 4/2016 | | |
| KR | 10-1628190 B1 | 6/2016 | | |
| KR | 101678398 B1 * | 6/2016 | ............ | A01N 25/24 |
| KR | 101648390 B1 * | 8/2016 | ............ | C09J 105/06 |
| KR | 10-1795425 B1 | 11/2017 | | |
| KR | 102296972 B1 * | 9/2021 | ............ | B01J 13/206 |

* cited by examiner

FIG. 3

```
                    ┌─────────┐
                    │  Start  │
                    └────┬────┘
                         ↓
    ┌────────────────────────────────────────────────┐
    │ Step of adding 10 to 20 parts by weight of     │
    │ dried cinnamon tree to 100 parts by weight of water │
    └────────────────────┬───────────────────────────┘
                         ↓
    ┌────────────────────────────────────────────────┐
    │ Step of heating water to temperature of 70 to 90° C │
    └────────────────────┬───────────────────────────┘
                         ↓
    ┌────────────────────────────────────────────────┐
    │ Step of heating water until water is reduced by half │
    └────────────────────┬───────────────────────────┘
                         ↓
    ┌────────────────────────────────────────────────┐
    │ Step of removing cinnamon tree to obtain coronavirus │
    │ antiviral material                             │
    └────────────────────┬───────────────────────────┘
                         ↓
                    ┌─────────┐
                    │   End   │
                    └─────────┘
```

FIG. 4

```
                    ┌─────────┐
                    │  Start  │
                    └────┬────┘
                         ▼
      ┌──────────────────────────────────────┐
      │ Step of drying and powdering horseradish │
      └──────────────────┬───────────────────┘
                         ▼
      ┌──────────────────────────────────────┐
      │ Step of adding 10 to 20 parts by weight│
      │ of horseradish powder to 100 parts by  │
      │ weight of water                         │
      └──────────────────┬───────────────────┘
                         ▼
      ┌──────────────────────────────────────┐
      │ Step of heating water to temperature of 70 to 90° C │
      └──────────────────┬───────────────────┘
                         ▼
      ┌──────────────────────────────────────┐
      │ Step of heating water until water is reduced by half to │
      │ obtain coronavirus antiviral material                    │
      └──────────────────┬───────────────────┘
                         ▼
                    ┌─────────┐
                    │   End   │
                    └─────────┘
```

FIG. 12

TEST REPORT

No: CT20-149708K

7. Test Results

1) NMK A-BMV

| Test item(s) | Unit | Test method | Test results | Remarks | Location |
|---|---|---|---|---|---|
| Fungal resistance test (after 4 weeks) | Grade | (1) | 0 | (29±0.2)°C (92.8±0.0)% R.H. | A |

※ Test fungi.
Aspergillus brasiliensis ATCC 9642
Penicillium funiculosum ATCC 11797
Chaetomium globosum ATCC 6205
Trichoderma virens ATCC 9645
Aureobasidium pullulans ATCC 15233

※ Incubation time: 4 weeks

※ Assessment of results: 0 = none
1 = Traces of growth (less than 10%)
2 = Light growth (10 to 30%)
3 = Medium growth (30 to 60%)
4 = Heavy growth (60% to complete coverage)

---End---

※ Location
A. Unit 108, Industry-Academic Cooperation Foundation,
Bukyong National University, 327, Jungang-ro, Anseong-si, Gyeonggi-do, Korea

ANTIMICROBIAL COATING COMPOSITION AND METHOD FOR PRODUCING THE SAME

BACKGROUND

1. Technical Field

The present invention relates to an antimicrobial coating composition and a method for producing the same, and more particularly, to a coating composition capable of killing viruses by coating various parts therewith through application.

2. Related Art

In modern society, various articles are handled daily and frequently by many people. Users of these articles can carry viruses that are prone to cause more or less serious epidemics and pandemics, and in this way can easily contaminate articles with which they come in contact. When such an article is subsequently handled by one or more other users, this article in turn becomes an important means of spreading the virus carried by the first user to others. In particular, it has been found to date that respiratory diseases such as coronavirus infect people by direct contact in a considerable number of cases, but can also infect people through bacteria and dust or through contact with contaminated articles.

In order to solve this problem, in recent years, various antimicrobial materials have been applied to things, articles, etc. to prevent secondary viral infection. As an example, horseradish contains an antimicrobial material called allyl isothiocyanate, and Korean Patent Application Publication No. 10-2005-0055644 discloses a method of extracting a high concentration of an antimicrobial material from horseradish by a distillation extraction process.

Specifically, the above Korean Patent Application Publication relates to a method of extracting an essential oil component including allyl isothiocyanate, which is an antimicrobial component, from horseradish by a distillation extraction process. It is disclosed that the essential oil component present in the pretreated horseradish raw material can be extracted using distilled water, an oil bath, and a concentrator to obtain the antimicrobial component allyl isothiocyanate, but when the antimicrobial material produced according to the method of the conventional art is applied, it reacts simultaneously, so that the antimicrobial activity thereof decreases over time. Thus, the antimicrobial material has a limitation in that it cannot exhibit sufficient antimicrobial activity.

SUMMARY

An object of the present invention is to provide an antimicrobial coating composition having excellent virus removal performance by retaining constant antimicrobial activity for a longer time than viruses.

To achieve the above object, the present invention provides an antimicrobial coating composition having antiviral activity against coronavirus, the composition comprising: an adhesive having adhesiveness to a surface coated therewith; and a coronavirus antiviral material which is to be attached to the surface by the adhesiveness of the adhesive and exhibits antiviral activity against coronavirus.

In the antimicrobial coating composition, the adhesive is an adhesive solution comprising a modified silane silicate and, based on 100 parts by weight of the modified silane silicate, 5 to 30 parts by weight of a hydrolyzable silane compound, 50 to 150 parts by weight of a water-dispersible polyurethane resin, 10 to 30 parts by weight of an acrylic emulsion resin, and 5 to 120 parts by weight of a solvent.

In addition, the coronavirus antiviral material is composed of a liquid stored inside a microcapsule, and the coronavirus antiviral material is contained in an amount of 20 to 50 parts by weight based on 100 parts by weight of the adhesive solution.

According to a first embodiment of the present invention, the coronavirus antiviral material stored in the microcapsule is present as a liquid, and the liquid contains a cinnamon component. In the first embodiment, the liquid is obtained by: adding 10 to 20 parts by weight of a dried cinnamon tree to 100 parts by weight of water; heating the water to a temperature of 70 to 90° C.; heating the water until the water is reduced by half; and then removing the cinnamon tree.

According to a second embodiment of the present invention, the coronavirus antiviral material stored in the microcapsule is present as a liquid, and the liquid contains a horseradish component. In the second embodiment, the liquid is obtained by drying and powdering horseradish; adding 10 to 20 parts by weight of the horseradish powder to 100 parts by weight of water; heating the water to a temperature of 70 to 90° C.; and heating the water until the water is reduced by half.

According to the present invention, the rate at which the antiviral material leaks from the microcapsule is controlled by changing the diameters of the microcapsules so that the antiviral activity against coronavirus is retained for a certain period of time.

More specifically, a first microcapsule group having a small outer diameter, a second microcapsule group having an intermediate outer diameter, and a third microcapsule having a large outer diameter are mixed together at a predetermined ratio, so that the rate at which the antiviral material leaks from the microcapsules is different between the microcapsules, whereby the antiviral activity against coronavirus is retained for at least 1 year to up to 5 years.

In addition, the first microcapsule group has an outer diameter of 3±3 μm, the second microcapsule group has an outer diameter of 9±3 μm, and the third microcapsule group has an outer diameter of 15±3 μm, and the first microcapsule group, the second microcapsule group and the third microcapsule group are mixed together in equal volumes.

In addition, the shell thickness of the microcapsule having an outer diameter of 15 to 18 μm is controlled so that the antiviral material leaks from the microcapsule within 6 months, the shell thickness of the microcapsule having an outer diameter of 12 to 15 μm is controlled so that the antiviral material leaks from the microcapsule within 1 year, the shell thickness of the microcapsule having an outer diameter of 9 to 12 μm is controlled so that the antiviral material leaks from the microcapsule within 1 to 2 years, the shell thickness of the microcapsule having an outer diameter of 6 to 9 μm is controlled so that the antiviral material leaks from the microcapsule within 2 to 3 years, the shell thickness of the microcapsule having an outer diameter of 3 to 6 μm is controlled so that the antiviral material leaks from the microcapsule within 3 to 4 years, and the shell thickness of the microcapsule having an outer diameter of 0.5 to 3 μm is controlled so that the antiviral material leaks from the microcapsule within 4 to 5 years.

The microcapsules which are included in the above-described antimicrobial coating composition according to the present invention are produced by an apparatus comprising: a core providing unit configured to store and provide an antiviral material which is a core material located inside the microcapsule; a shell providing unit configured to store and provide a shell material that is a material surrounding the core; a micro-nozzle unit connected to provision lines, which provide the materials from the core providing unit and the shell providing unit, and configured to discharge microcapsules in which the shell material provided from the shell providing unit surrounds the core material provided from the core providing unit; a capsule curing tank containing a solidifying liquid to solidify the shell material of the microcapsule; a washing tank for washing the microcapsules cured in the capsule curing tank; and a drying furnace for drying the microcapsules washed in the washing tank.

In addition, the core providing unit comprises: a core cylinder; a core piston located inside the core cylinder; a core rod coupled to one side of the core piston; a core guide configured to guide the core rod; and a core transfer means for moving the core rod at a predetermined speed. Thus, the core material contained in the core cylinder is supplied to the micro-nozzle unit.

The core transfer means comprises: a core rod threaded portion provided on the outer surface of the core rod; a core pinion disposed to be in contact with the core rod; a core pinion threaded portion formed along the outer circumferential surface of the core pinion so as to engage the core rod threaded portion; and a core motor by a shaft to the core pinion. Accordingly, the core pinion rotates by the rotation of the core motor, and the moving speed of the core rod is controlled by the rotation of the core pinion so that the core material located inside the core cylinder is supplied to the micro-nozzle unit.

In addition, the shell providing unit comprises a shell cylinder, a shell piston located inside the shell cylinder, a shell rod coupled to the shell piston, and a shell guide configured to guide the shell rod, and further comprises a shell transfer means for moving the shell rod at a predetermined speed. Thus, the shell material contained in the shell cylinder is supplied to the micro-nozzle unit 1300.

According to a preferred embodiment, the shell transfer means comprises: a shell rod threaded portion provided on the outer surface of the shell rod; a shell pinion disposed to be in contact with the shell rod; a shell pinion threaded portion formed along the outer circumferential surface of the shell pinion so as to engage the shell rod threaded portion; and a shell motor connected by a shaft to the shell pinion. According to the structure described above, the shell pinion rotates by the rotation of the shell motor, and the movement speed of the shell rod is controlled by the rotation of the shell pinion so that the shell material located inside the shell cylinder is supplied to the micro-nozzle unit.

In addition, the apparatus comprises: a core material supply line configured to transfer the core material to the micro-nozzle unit; and a shell material supply line configured to transfer the shell material to the micro-nozzle unit. Through these lines, the core material and the shell material are supplied to the micro-nozzle unit.

In addition, the core material supply line for transferring the core material is provided between the core providing unit and the micro-nozzle unit, and the shell material supply line for transferring the shell material is provided between the shell providing unit and the micro-nozzle unit.

In addition, the micro-nozzle unit includes: an inner cylindrical part into which the core material is introduced; an outer cylindrical part surrounding the outer surface of the inner cylindrical part while forming a space therebetween; an inner nozzle provided at the bottom of the inner cylindrical part while communicating with the inner cylindrical part and having a smaller cross-sectional area than the inner cylindrical part; and an outer nozzle provided at the bottom of the outer cylindrical part and communicating with the outer cylindrical part and surrounding the outer surface of the inner nozzle while forming a space therebetween.

In addition, the tip of the inner nozzle is located inside the tip of the outer nozzle so that the relationship between L and D satisfies L>D, wherein L is the distance from the tip of the inner nozzle to the tip of the outer nozzle, and D is the diameter of the inner nozzle.

Furthermore, the micro-nozzle unit comprises a separation means configured such that the core material that has passed through the inner nozzle is separated into a predetermined size in a state in which it is covered by the shell material, thus producing the microcapsules.

In addition, the separation means comprises an ultrasonic vibrating part mounted on the upper surface of the micro-nozzle unit and configured to vibrate the micro-nozzle unit up and down, and as the ultrasonic vibrating part vibrates up and down, the microcapsules having a predetermined size are formed in a state in which the core material that passed through the inner nozzle is covered by the shell material.

The microcapsule comprises a core formed of the core material and a shell formed of the shell material, and the relationship between D1, which is the diameter of the core, and D2, which is the diameter of the shell, satisfies $D1=K*D2$.

K is 1.2 to 7, and the K value is determined by controlling V1, which is the supply speed at which the material of the core is transferred through the core material supply line to the micro-nozzle unit, and V2 which is the supply speed at which the material of the shell is transferred through the shell material supply line to the micro-nozzle unit.

At this time, the thickness t of the shell is controlled by setting V2 at a constant speed and adjusting V1. Here, $t=(D2-D1)/2$. As V1 increases, t decreases, and V1 decreases, t increases.

Alternatively, the thickness t of the shell is controlled by setting V1 at a constant speed and adjusting V2. Here, $t=(D2-D1)/2$. As V2 increases, t decreases, and V2 decreases, t increases.

In addition, the material of the shell 1920 is any one or a mixture of two or more selected from among melamine resin, urethane resin, fumed silica, gelatin, polyphosphate, mixtures of polysaccharides, alginate, chitosan, pectin, starch, cellulose, methyl cellulose, ethyl cellulose, hydroxyethyl cellulose, carboxymethyl cellulose, vegetable protein, animal protein, agar, albumin, xanthan, and gellan gum.

The features and advantages of the present invention will become more apparent from the following detailed description taken in conjunction with the accompanying drawings.

According to the present invention, it is possible to produce microcapsules with a controlled size, and thus it is possible to control the reaction rate of the coronavirus antibacterial material inside the microcapsules, and to easily and quickly produce microcapsules having various sizes and containing the coronavirus antiviral material of various sizes. In addition, the microcapsules may react immediately after application of the antimicrobial coating composition of the present invention, and the antiviral material, which is the core material inside the shell material, may leak from the microcapsules during different periods of time, so that the antimicrobial performance of the microcapsules can be kept constant.

BRIEF DESCRIPTION OF THE DRAWINGS

FIG. 3 is a flow chart showing a method of producing a coronavirus antiviral material which is stored in microcapsules according to a first embodiment of the present invention.

FIG. 4 is a flow chart showing a method of producing a coronavirus antiviral material which is stored in microcapsules according to a second embodiment of the present invention.

FIG. 12 is a test report showing the results of applying the antimicrobial coating composition of the present invention to incubation of fungal strains.

DETAILED DESCRIPTION

Hereinafter, preferred embodiments of the present invention will be described with reference to the accompanying drawings. In the following drawings, the thickness of lines or the size of constituent elements may be illustrated exaggeratingly for the clarity and convenience of description.

In addition, the terms used in the following description are terms defined taking into consideration their functions in the present invention, and may be changed in accordance with the option of a user or operator or a usual practice. Accordingly, the definition of these terms should be made based on the contents throughout the present specification.

In addition, the following embodiments do not limit the scope of the present invention, but serve merely to illustrate the components set forth in the claims of the present invention, and the embodiments including constituent elements which are included in the entire description of the present invention and are replaceable as equivalents of the constituent elements in the claims may be included in the scope of the present invention.

Figure 1:
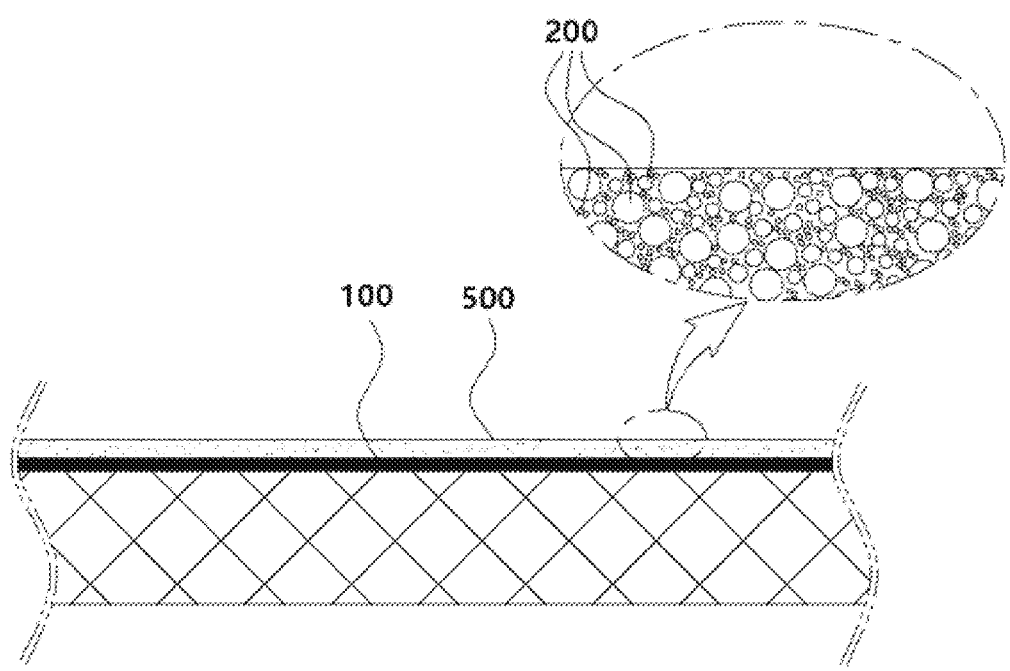
FIG. 1 is 1 is a cross-sectional view schematically showing a state in which the antimicrobial coating composition of the present invention is applied to a surface.

FIG. 1 is a cross-sectional view schematically showing a state in which the antimicrobial coating composition of the present invention is applied to a surface.

Referring to FIG. 1, the antimicrobial coating composition having antiviral activity against coronavirus according to the present invention contains: an adhesive 100 having adhesiveness to a surface coated therewith; and a coronavirus antiviral material 500 which is to be attached to the surface by the adhesiveness of the adhesive and exhibits antiviral activity against coronavirus.

In the antimicrobial coating composition, the adhesive is an adhesive solution comprising a modified silane silicate and, based on 100 parts by weight of the modified silane silicate, 5 to 30 parts by weight of a hydrolyzable silane compound, 50 to 150 parts by weight of a water-dispersible polyurethane resin, 10 to 30 parts by weight of an acrylic emulsion resin, and 5 to 120 parts by weight of a solvent.

In addition, the coronavirus antiviral material 500 is composed of a liquid stored inside a microcapsule 200, and the coronavirus antiviral material 500 is contained in an amount of 20 to 50 parts by weight based on 100 parts by weight of the adhesive solution.

According to the present invention, the rate at which the antiviral material leaks from the microcapsule 200 is controlled by changing the diameters of the microcapsules 200 so that the antiviral activity against coronavirus is retained for a certain period of time.

More specifically, a first microcapsule group having a small outer diameter, a second microcapsule group having an intermediate outer diameter, and a third microcapsule having a large outer diameter are mixed at a predetermined ratio, so that the rate at which the antiviral material leaks from the microcapsules 200 is different between the microcapsules 200, whereby the antiviral activity against coronavirus is retained for at least 1 year to up to 5 years.

Figure 2:
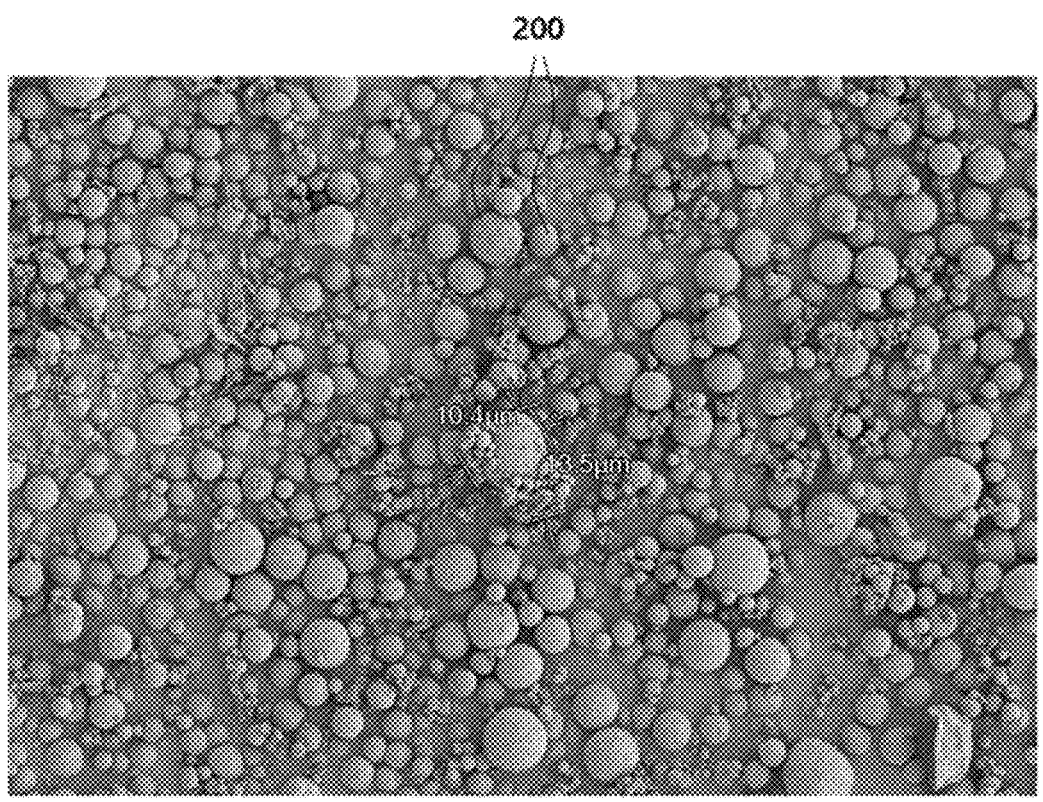
FIG. 2 is an electron micrograph showing the microcapsule size distribution of the antimicrobial coating composition of the present invention.

FIG. 2 is an electron micrograph showing the microcapsule size distribution of the antimicrobial coating composition of the present invention.

FIG. 2 is an electron micrograph of the antimicrobial coating composition obtained by mixing microcapsules having various outer diameters within the range of 1 to 20 μm, and as can be seen therein, microcapsules having various outer diameters within the range of 1 to 20 μm are distributed.

the first microcapsule group has an outer diameter of 3±3 μm, the second microcapsule group has an outer diameter of 9±3 μm, and the third microcapsule group has an outer diameter of 15±3 μm, and the first microcapsule group, the second microcapsule group and the third microcapsule group are mixed together in equal volumes.

Specifically, when the microcapsules 200 are formed to have a small outer diameter, the amount of leakage of the liquid in the microcapsules is reduced. Thus, to ensure excellent antimicrobial effects, the microcapsules belonging to the first, second and third groups are preferably mixed together in equal volumes.

In addition, the shell thickness of the microcapsule 200 having an outer diameter of 15 to 18 μm is controlled 200 so that the antiviral material leaks from the microcapsule within 6 months; the shell thickness of the microcapsule 200 having an outer diameter of 12 to 15 μm is controlled so that the antiviral material leaks from the microcapsule 200 within 1 year; the shell thickness of the microcapsule 200 having an outer diameter of 9 to 12 μm is controlled so that the antiviral material leaks from the microcapsule 200 within 1 to 2 years; the shell thickness of the microcapsule 200 having an outer diameter of 6 to 9 μm is controlled so that the antiviral material leaks from the microcapsule 200 within 2 to 3 years; the shell thickness of the microcapsule 200 having an outer diameter of 3 to 6 μm is controlled so that the antiviral material leaks from the microcapsule 200 within 3 to 4 years; and the shell thickness of the microcapsule 200 having an outer diameter of 0.5 to 3 μm is controlled so that the antiviral material leaks from the microcapsule 200 within 4 to 5 years.

FIG. 3 is a flow chart showing a method of producing a coronavirus antiviral material which is stored in microcapsules according to a first embodiment of the present invention.

According to a first embodiment of the present invention, the coronavirus antiviral material stored in the microcapsule is present as a liquid, and the liquid contains a cinnamon component. In the first embodiment, the liquid is obtained by: adding 10 to 20 parts by weight of a dried cinnamon tree to 100 parts by weight of water; heating the water to a temperature of 70 to 90° C.; heating the water until the water is reduced by half; and then removing the cinnamon tree.

FIG. 4 is a flow chart showing a method of producing a coronavirus antiviral material which is stored in microcapsules according to a second embodiment of the present invention.

According to the second embodiment of the present invention, the coronavirus antiviral material 500 stored in the microcapsules is present as a liquid, and the liquid contains a horseradish component. In the second embodiment, the liquid is obtained by: drying and powdering horseradish; adding 10 to 20 parts by weight of the horseradish powder to 100 parts by weight of water; heating the water to a temperature of 70 to 90° C.; and heating the water until the water is reduced by half.

Figure 5:
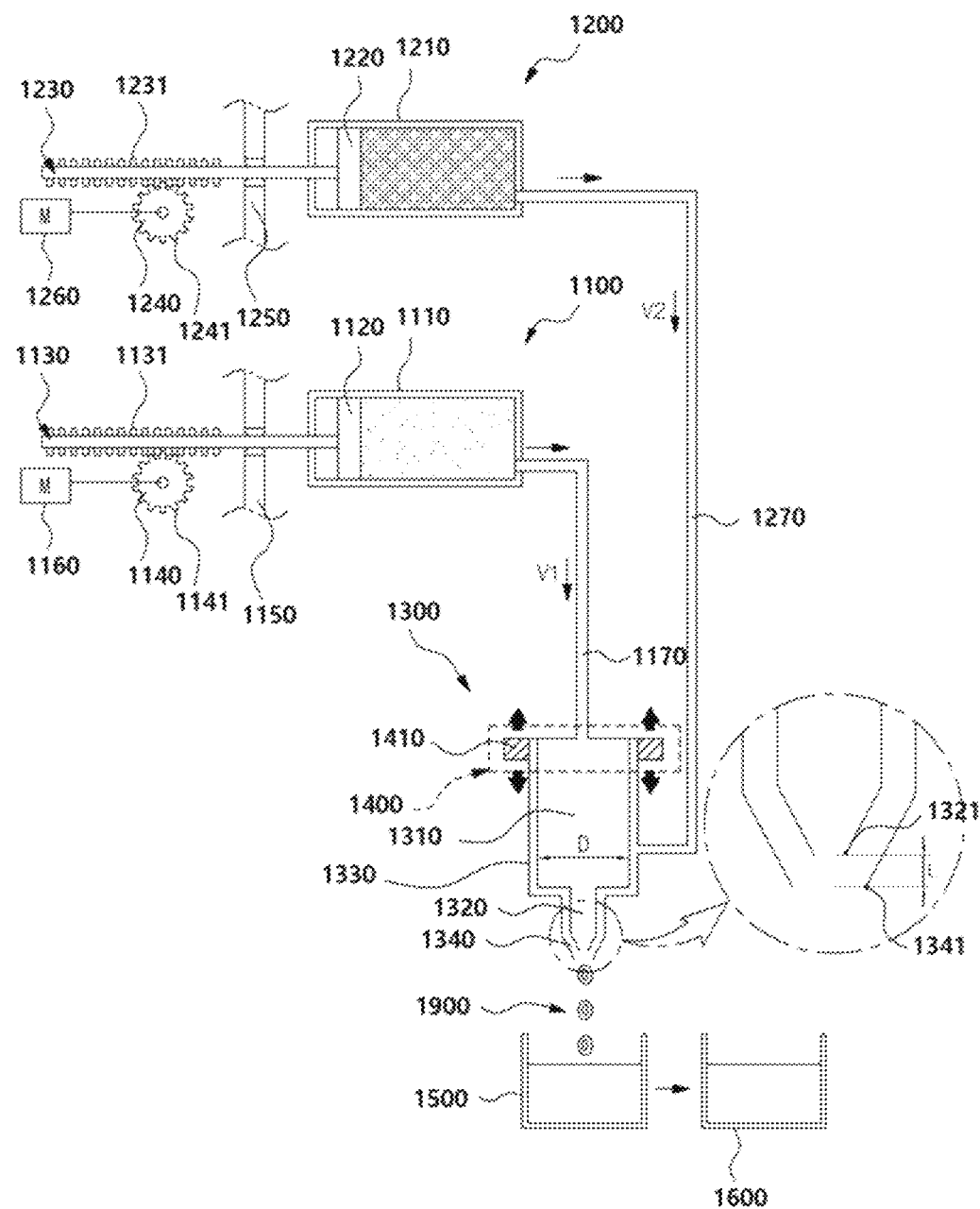
FIG. 5 schematically shows the structure of an apparatus for producing an antimicrobial coating composition according to the present invention.

FIG. 5 schematically shows the structure of an apparatus for producing an antimicrobial coating composition according to the present invention.

Referring to FIG. 5, the apparatus for producing microcapsules 200 which are included in the above-described antimicrobial coating composition according to the present invention comprises: a core providing unit 1100 configured to store and provide an antiviral material which is a core material located inside the microcapsule 200; a shell providing unit 1200 configured to store and provide a shell material that is a material surrounding the core; a micro-nozzle unit 1300 connected to provision lines, which provide the materials from the core providing unit 1100 and the shell providing unit 1200, and configured to discharge the microcapsules 200 in which the shell material provided from the shell providing unit 1200 surrounds the core material provided from the core providing unit 1100; a capsule curing tank 1500 containing a solidifying liquid to solidify the shell material of the microcapsule 200; a washing tank 1600 for washing the microcapsules 200 cured in the capsule curing tank; and a drying furnace 1650 for drying the microcapsules 200 washed in the washing tank.

In the apparatus, the core providing unit 1100 comprises: a core cylinder 1110; a core piston 1120 located inside the core cylinder 1110; a core rod 1130 coupled to one side of the core piston 1120; a core guide 1150 configured to guide the core rod 1130; and a core transfer means for moving the core rod 1130 at a predetermined speed. Thus, the core material contained in the core cylinder 1110 is supplied to the micro-nozzle unit 1300.

The core transfer means comprises: a core rod threaded portion 1131 provided on the outer surface of the core rod 1130; a core pinion 1140 disposed to be in contact with the core rod 1130; a core pinion threaded portion 1141 formed along the outer circumferential surface of the core pinion so as to engage the core rod threaded portion 1131; and a core motor 1160 by a shaft to the core pinion. Accordingly, the core pinion 1140 rotates by the rotation of the core motor, and the moving speed of the core rod 1130 is controlled by the rotation of the core pinion so that the core material located inside the core cylinder 1110 is supplied to the micro-nozzle unit 1300.

In addition, the shell providing unit 1200 comprises a shell cylinder 1210, a shell piston 1220 located inside the shell cylinder 1210, a shell rod 1230 coupled to the shell piston 1220, and a shell guide 1250 configured to guide the shell rod 1230, and further comprises a shell transfer means for moving the shell rod 1230 at a predetermined speed. Thus, the shell material contained in the shell cylinder 1210 is supplied to the micro-nozzle unit 1300.

According to a preferred embodiment, the shell transfer means comprises: a shell rod threaded portion 1231 provided on the outer surface of the shell rod 1230; a shell pinion 1240 disposed to be in contact with the shell rod; a shell pinion threaded portion 1241 formed along the outer circumferential surface of the shell pinion 1240 so as to engage the shell rod threaded portion 1231; and a shell motor 1260 connected by a shaft to the shell pinion 1240. According to the structure described above, the shell pinion 1240 rotates by the rotation of the shell motor 1260, and the movement speed of the shell rod 1230 is controlled by the rotation of the shell pinion 1240 so that the shell material located inside the shell cylinder 1210 is supplied to the micro-nozzle unit 1300.

In addition, the apparatus comprises: a core material supply line 1170 configured to transfer the core material to the micro-nozzle unit 1300; and a shell material supply line 1270 configured to transfer the shell material to the micro-nozzle unit 1300. Through these lines, the core material and the shell material are supplied to the micro-nozzle unit 1300.

In addition, the core material supply line 1170 for transferring the core material is provided between the core providing unit 1100 and the micro-nozzle unit 1300, and the shell material supply line 1270 for transferring the shell material is provided between the shell providing unit 1200 and the micro-nozzle unit 1300.

In addition, the micro-nozzle unit 1300 includes: an inner cylindrical part 1310 into which the core material is introduced; an outer cylindrical part 1330 surrounding the outer surface of the inner cylindrical part 1310 while forming a space therebetween; an inner nozzle 1320 provided at the bottom of the inner cylindrical part 1310 while communicating with the inner cylindrical part 1310 and having a smaller cross-sectional area than the inner cylindrical part 1310; and an outer nozzle 1340 provided at the bottom of the outer cylindrical part 1330 and communicating with the outer cylindrical part 1330 and surrounding the outer surface of the inner nozzle 1320 while forming a space therebetween.

In addition, the tip 1321 of the inner nozzle is located inside the tip 1341 of the outer nozzle so that the relationship between L and D satisfies L>D, wherein L is the distance from the tip 1321 of the inner nozzle to the tip 1341 of the outer nozzle, and D is the diameter of the inner nozzle 1320.

Furthermore, the micro-nozzle unit 1300 comprises a separation means 1400 configured such that the core material that has passed through the inner nozzle 1320 is separated into a predetermined size in a state in which it is covered by the shell material, thus producing the microcapsules 200.

In addition, the separation means 1400 comprises an ultrasonic vibrating part 1410 mounted on the upper surface of the micro-nozzle unit 1300 and configured to vibrate the micro-nozzle unit 1300 up and down, and as the ultrasonic vibrating part vibrates up and down, the microcapsules 200 having a predetermined size are formed in a state in which the core material that passed through the inner nozzle 1320 is covered by the shell material.

Figure 6:
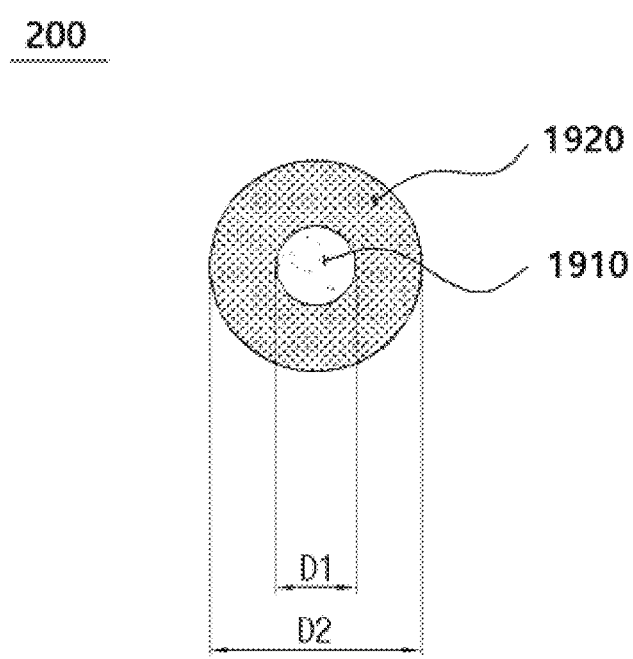
FIG. 6 shows a cross-sectional shape of the microcapsule of the present invention.

FIG. 6 shows a cross-sectional shape of the microcapsule of the present invention.

Referring to FIG. 6, the microcapsule 200 comprises a core 1910 formed of the core material and a shell 1920 formed of the shell material, and the relationship between D1, which is the diameter of the core 1910, and D2, which is the diameter of the shell 1920, satisfies D1=K*D2.

Here, K is 1.2 to 7, and the K value is determined by controlling V1, which is the supply speed at which the material of the core 1910 is transferred through the core material supply line to the micro-nozzle unit, and V2 which is the supply speed at which the material of the shell 1920 is transferred through the shell material supply line to the micro-nozzle unit.

At this time, the thickness t of the shell 1920 is controlled by setting V2 at a constant speed and adjusting V1. Here, t=(D2−D1)/2. As V1 increases, t decreases, and V1 decreases, t increases.

Alternatively, the thickness t of the shell 1920 is controlled by setting V1 at a constant speed and adjusting V2. Here, t=(D2−D1)/2. As V2 increases, t decreases, and V2 decreases, t increases.

In addition, the material of the shell 1920 is any one or a mixture of two or more selected from among melamine resin, urethane resin, fumed silica, gelatin, polyphosphate, mixtures of polysaccharides, alginate, chitosan, pectin, starch, cellulose, methyl cellulose, ethyl cellulose, hydroxyethyl cellulose, carboxymethyl cellulose, vegetable protein, animal protein, agar, albumin, xanthan, and gellan gum.

Figure 7:
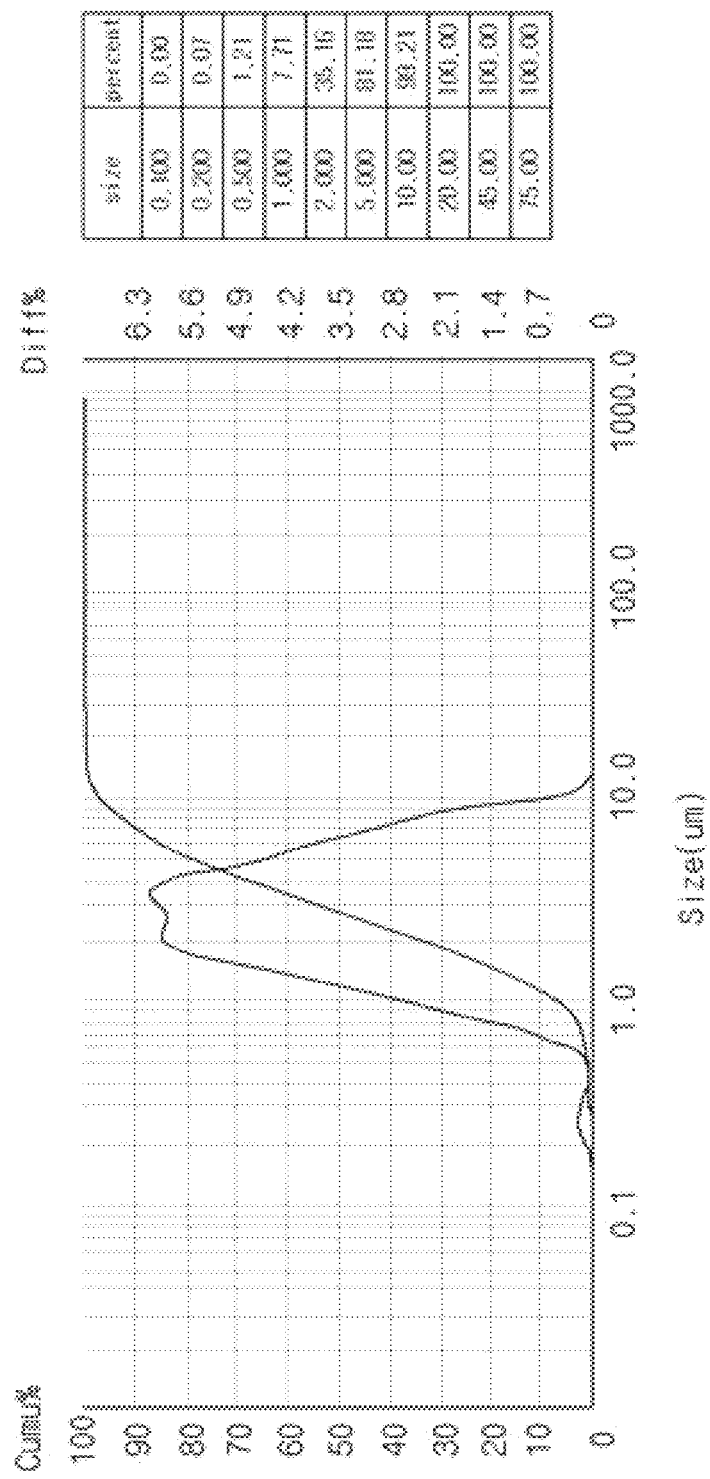
FIGS. 7 to 9 are tables showing the microcapsule size distribution of the antimicrobial coating composition produced by the method of the present invention.
Figure 8:
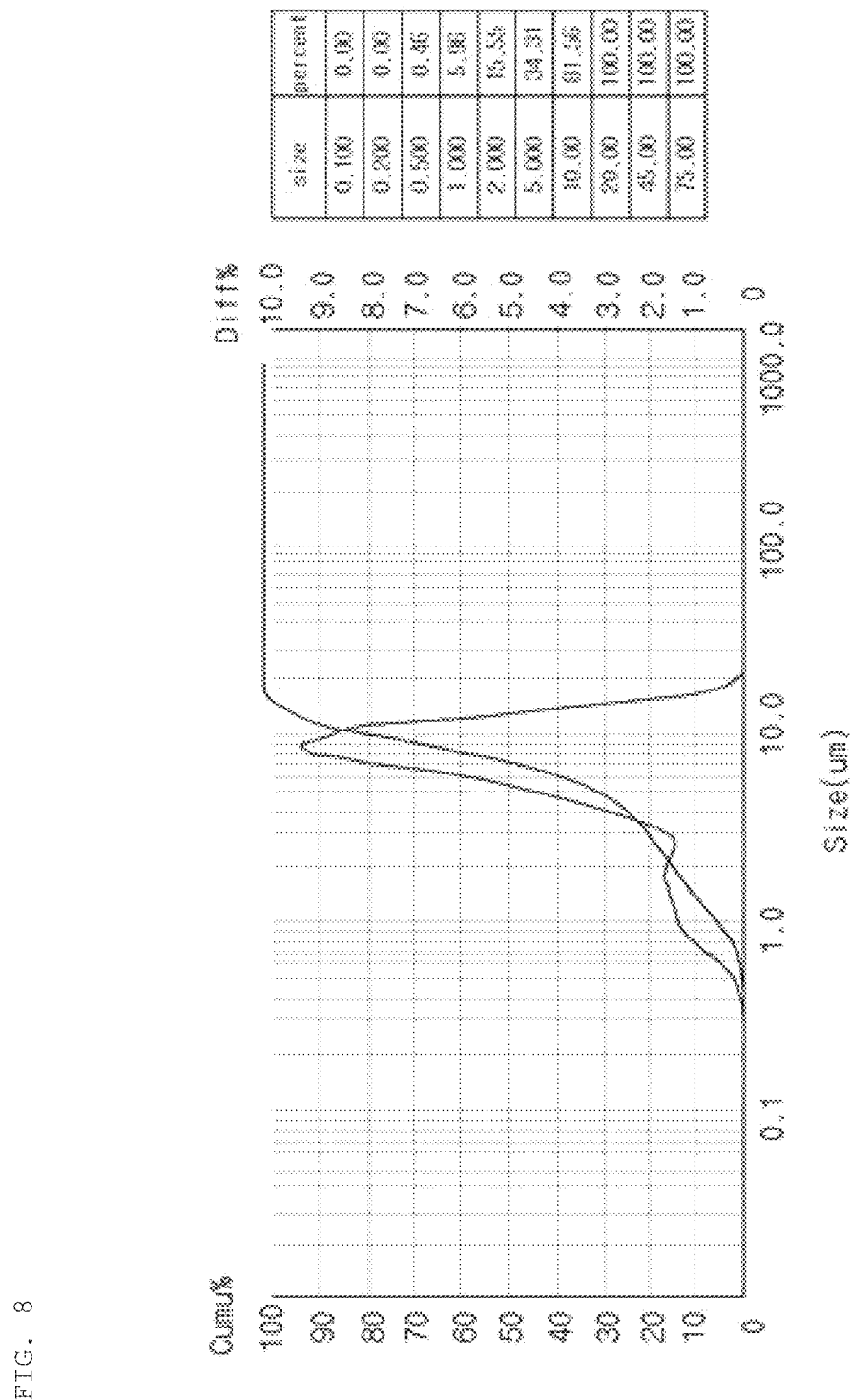
Figure 9:
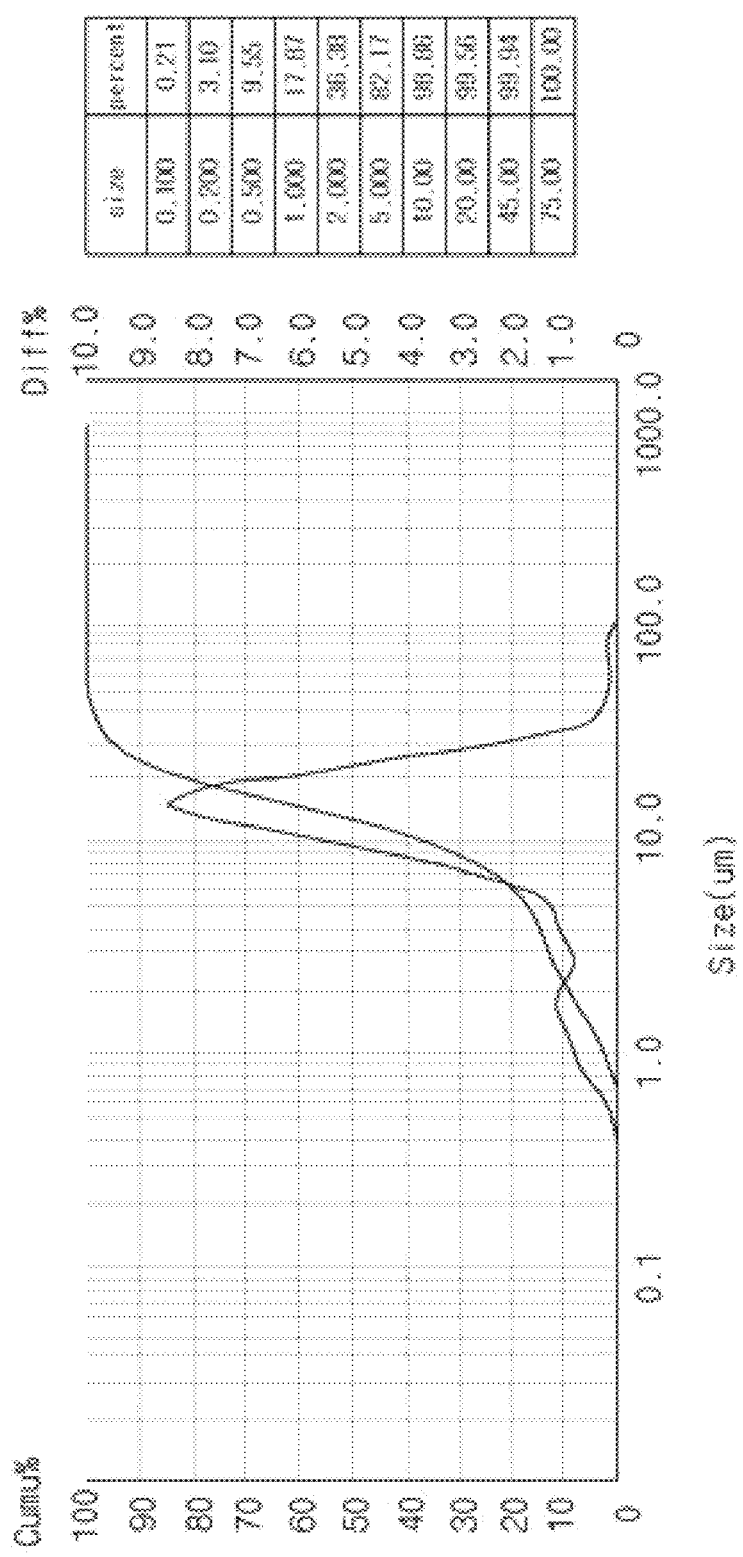

FIGS. 7 to 9 are tables showing the microcapsule size distribution of the antimicrobial coating composition produced by the method of the present invention.

Referring to FIGS. 7 to 9, it can be seen that the antimicrobial coating composition produced by the method of the present invention described above may be produced by easily controlling the microcapsule size distribution.

Referring to FIG. 7, it can be confirmed that the proportion of microcapsules having a microcapsule size of 1 to 6 μm among the microcapsules (size: 3±3 μm) produced by the method of the present invention is about 80%.

Referring to FIG. 8, it can be confirmed that the proportion of microcapsules having a microcapsule size of 5 to 11 μm among the microcapsules (size: 8±3 μm) produced by the method of the present invention is about 65%.

Referring to FIG. 9, it can be confirmed that the proportion of microcapsules having a microcapsule size of 12 to 18 μm among the microcapsules (size: 15±3 μm) produced by the method of the present invention is about 65%.

Figure 10:
FIG. 10 is a test report on the virus killing effect of the antimicrobial coating composition of the present invention.

FIG. 10 is a test report on the virus killing effect of the antimicrobial coating composition of the present invention.

Specifically, FIG. 10 is a test report on the killing of SARS-CoV-2, a virus that causes COVID-19. As can be seen therein, as a result of providing a specimen coated with the product produced according to the present invention, attaching COVID virus to the specimen and examining the survival rate of the virus, it was confirmed that the virus reduction rate after 24 hours was 92%, suggesting that the virus was killed by the coating composition of the present invention.

The coating composition used in the testing performed in the present invention was prepared so that the liquid inside the microcapsule would leak within 10 to 15 hours in order to shorten the treatment time. Accordingly, there was no change until 90 minutes, and hen almost all of the viruses were killed within 24 hours.

As described above, it is possible to prevent secondary infection with SARS-CoV-2, a virus that causes COVID-19, by coating necessary portions (handles, elevator floor presses, number keys, etc.) by spraying of the coating agent composition of the present invention.

Figure 11:
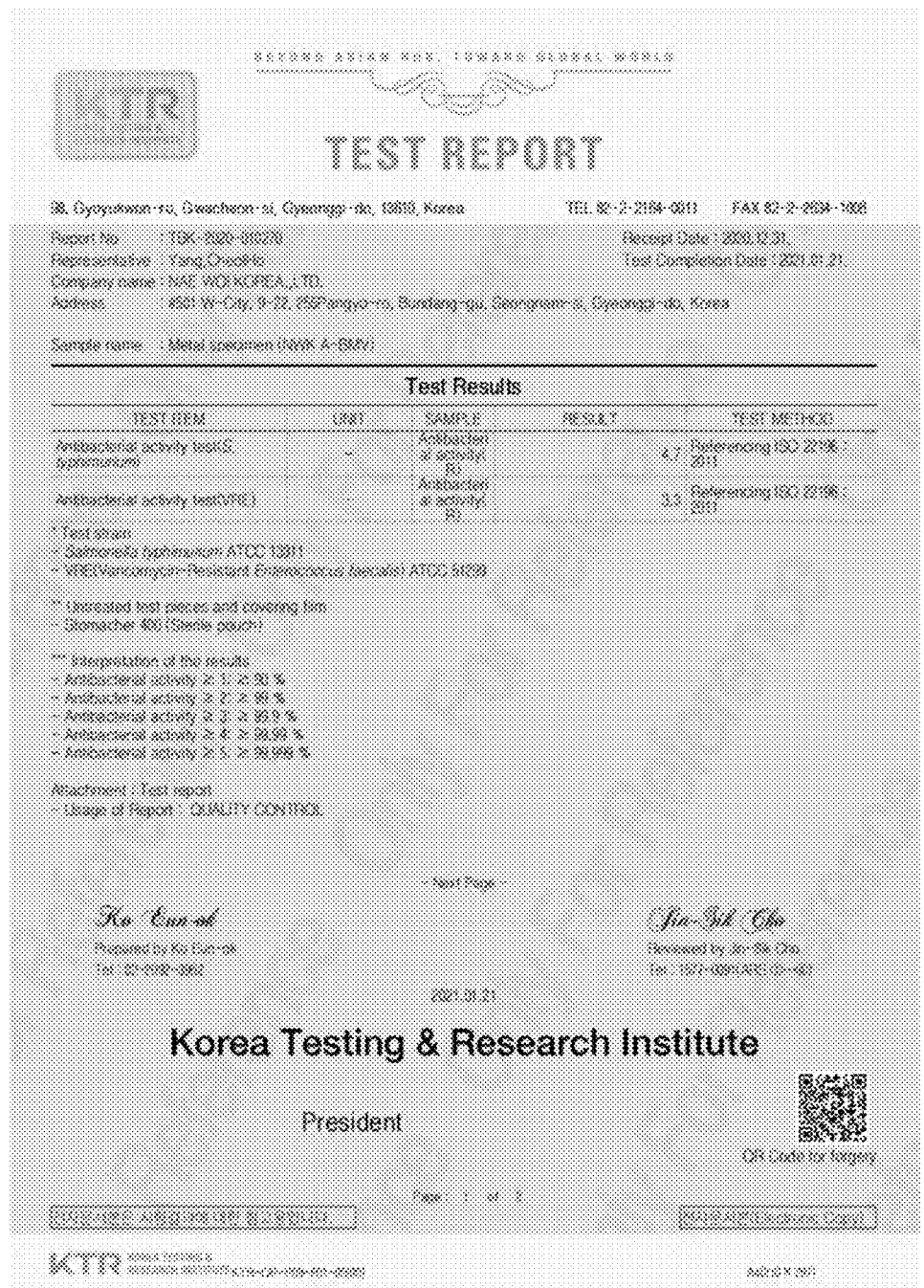
FIG. 11 is a test report showing the *Salmonella typhimurium* and vancomycin-resistant *Enterococcus* (VRE) *faecalis* killing abilities of the antimicrobial coating composition produced by the method of the present invention.

FIG. 11 shows the results of another antimicrobial test, and is a test report showing the *Salmonella typhimurium* and vancomycin-resistant *Enterococcus* (VRE) *faecalis* killing abilities of the antimicrobial coating composition produced by the method of the present invention.

The test method in FIG. 11 was performed according to ISO22196, and the test results indicated that the composition of the present invention showed a result value of 4.7 (antibacterial activity of 99.999%) against *Salmonella typhimurium* and a result value of 3.3 (antibacterial activity of 99.9%) against VRE, suggesting that the composition of the present invention has excellent antimicrobial effects not only against corona virus, but also *Salmonella* and VRE.

FIG. 12 is a test report showing the results of applying the antimicrobial coating composition of the present invention to incubation of fungal strains. As a result of the test, it was confirmed that, when the antimicrobial coating composition of the present invention was applied, the fungal strains did not grow. Accordingly, it can be confirmed that the composition of the present invention has an excellent effect of inhibiting the growth of fungal strains.

Although the present invention has been described in detail with reference to the specific embodiments, these embodiments are intended to describe the present invention in detail, and the present invention is not limited thereto. Those of ordinary skill in the art will appreciate that various modifications or improvements are possible without departing from the technical spirit of the present invention.

All simple modifications or variations of the present invention fall within the scope of the present invention, and the specific protection scope of the present invention will be defined by the appended claims.

What is claimed is:

1. An antimicrobial coating composition having antiviral activity against coronavirus, the composition comprising:
   an adhesive having adhesiveness to a surface coated therewith; and
   a coronavirus antiviral material which is to be attached to the surface by the adhesiveness of the adhesive and exhibits antiviral activity against coronavirus,
   wherein a rate at which the antiviral material leaks from the microcapsules is controlled by changing diameters of the microcapsules so that the antiviral activity against coronavirus is retained for a predetermined period of time,
   wherein the microcapsules comprise:
      a first microcapsule group has an outer diameter of 3±3 μm;
      a second microcapsule group has an outer diameter of 9±3 μm; and
      a third microcapsule group has an outer diameter of 15±3 μm,
   wherein the microcapsule comprises a core formed of a core material and a shell formed of a shell material, and a relationship between D1, which is a diameter of the core, and D2, which is a diameter of the shell, satisfies D1=K*D2,
   wherein K is 1.2 to 7 and is determined by controlling V1, which is a transfer speed at which the core material is transferred through the core material supply line to the micro-nozzle unit, and V2 which is a transfer speed at which the shell material is transferred through the shell material supply line to the micro-nozzle unit.

2. The antimicrobial coating composition of claim 1, wherein the adhesive is an adhesive solution comprising a modified silane silicate and, based on 100 parts by weight of the modified silane silicate, 5 to 30 parts by weight of a hydrolyzable silane compound, 50 to 150 parts by weight of a water-dispersible polyurethane resin, 10 to 30 parts by weight of an acrylic emulsion resin, and 5 to 120 parts by weight of a solvent.

3. The antimicrobial coating composition of claim 2, wherein the coronavirus antiviral material is composed of a liquid stored inside microcapsules, and the coronavirus antiviral material is comprised in an amount of 20 to 50 parts by weight based on 100 parts by weight of the adhesive solution.

4. The antimicrobial coating composition of claim 3, wherein the coronavirus antiviral material stored in the microcapsules is present as a liquid, and the liquid contains a cinnamon component.

5. The antimicrobial coating composition of claim 4, wherein the liquid is obtained by: adding 10 to 20 parts by weight of a dried cinnamon tree to 100 parts by weight of water; heating the water to a temperature of 70 to 90° C.; heating the water until the water is reduced by half; and then removing the cinnamon tree.

6. The antimicrobial coating composition of claim 3, wherein the coronavirus antiviral material stored in the microcapsules is present as a liquid, and the liquid contains a horseradish component.

7. The antimicrobial coating composition of claim 6, wherein the liquid is obtained by: drying and powdering horseradish; adding 10 to 20 parts by weight of the horseradish powder to 100 parts by weight of water; heating the water to a temperature of 70 to 90° C.; and heating the water until the water is reduced by half.

8. The antimicrobial coating composition of claim 3, wherein the microcapsules are mixed together at a predetermined ratio, so that the rate at which the antiviral material leaks from the microcapsules is different between each of the microcapsules, whereby the antiviral activity against coronavirus is retained for at least 1 year to up to 5 years.

9. The antimicrobial coating composition of claim 8, wherein
the first microcapsule group, the second microcapsule group and the third microcapsule group are mixed together in equal volumes.

10. The antimicrobial coating composition of claim 8, wherein a shell thickness of the microcapsule having an outer diameter of 15 to 18 μm is controlled so that the antiviral material leaks from the microcapsule within 6 months; a shell thickness of the microcapsule having an outer diameter of 12 to 15 μm is controlled so that the antiviral material leaks from the microcapsule within 1 year; a shell thickness of the microcapsule having an outer diameter of 9 to 12 μm is controlled so that the antiviral material leaks from the microcapsule within 1 to 2 years; a shell thickness of the microcapsule having an outer diameter of 6 to 9 μm is controlled so that the antiviral material leaks from the microcapsule within 2 to 3 years; a shell thickness of the microcapsule having an outer diameter of 3 to 6 μm is controlled so that the antiviral material leaks from the microcapsule within 3 to 4 years; and a shell thickness of the microcapsule having an outer diameter of 0.5 to 3 μm is controlled so that the antiviral material leaks from the microcapsule within 4 to 5 years.

11. The antimicrobial coating composition of claim 10, wherein the microcapsules are produced by an apparatus comprising:
a core providing unit configured to store and provide an antiviral material which is the core material located inside the microcapsule;
a shell providing unit configured to store and provide the shell material that is a material surrounding the core;
a micro-nozzle unit connected to provision lines, which provide the materials from the core providing unit and the shell providing unit, and configured to discharge microcapsules in which the shell material transferred from the shell providing unit surrounds the core material transferred from the core providing unit;
a capsule curing tank containing a solidifying liquid to solidify the shell material of the microcapsule;
a washing tank for washing the microcapsules cured in the capsule curing tank; and
a drying furnace for drying the microcapsules washed in the washing tank.

12. The antimicrobial coating composition of claim 11, wherein the micro-nozzle unit comprises a separation means configured such that the core material that has passed through the inner nozzle is separated into a predetermined size in a state in which it is covered by the shell material, thus producing the microcapsules.

13. The antimicrobial coating composition of claim 12, wherein the separation means comprises an ultrasonic vibrating part mounted on the upper surface of the micro-nozzle unit and configured to vibrate the micro-nozzle unit up and down, and as the ultrasonic vibrating part vibrates up and down, the microcapsules having a predetermined size are formed in a state in which the core material that passed through the inner nozzle is covered by the shell material.

* * * * *